(12) United States Patent
Vonhoff

(10) Patent No.: US 7,585,086 B2
(45) Date of Patent: Sep. 8, 2009

(54) THERMOPLASTIC LIGHT ENCLOSURE HAVING UPPER AND LOWER SEALED PARTS

(75) Inventor: Jürgen Vonhoff, Osnabrück (DE)

(73) Assignee: IBV Holding GmbH, Osnabrück (DE)

( * ) Notice: Subject to any disclaimer, the term of this patent is extended or adjusted under 35 U.S.C. 154(b) by 162 days.

(21) Appl. No.: 10/565,639

(22) PCT Filed: Jul. 10, 2004

(86) PCT No.: PCT/EP2004/007619

§ 371 (c)(1),
(2), (4) Date: Oct. 30, 2006

(87) PCT Pub. No.: WO2005/015082

PCT Pub. Date: Feb. 17, 2005

(65) Prior Publication Data

US 2007/0108666 A1 May 17, 2007

(30) Foreign Application Priority Data

Jul. 25, 2003 (DE) ................................. 103 33 980

(51) Int. Cl.
*F21V 21/00* (2006.01)
(52) U.S. Cl. .................. 362/217.01; 362/222; 362/263; 362/267; 362/158
(58) Field of Classification Search ................. 362/375, 362/263, 147, 158, 217, 223, 249, 260, 267, 362/329, 363, 364, 404
See application file for complete search history.

(56) References Cited

U.S. PATENT DOCUMENTS

| 4,210,841 | A | * | 7/1980 | Vodicka et al. | ............... | 313/111 |
| 4,379,321 | A | * | 4/1983 | Plemmons et al. | .......... | 362/267 |
| 4,384,316 | A | * | 5/1983 | de Vos et al. | ................ | 362/147 |
| 4,398,239 | A | * | 8/1983 | de Vos et al. | ................ | 362/263 |
| 4,760,508 | A | * | 7/1988 | Russello et al. | ............. | 362/285 |
| 6,439,741 | B1 | * | 8/2002 | Diaz et al. | ................... | 362/396 |
| 6,439,742 | B1 | * | 8/2002 | Lavergne | .................... | 362/220 |

FOREIGN PATENT DOCUMENTS

| EP | 0 179 453 | 4/1986 |
| EP | 0 829 677 | 3/1998 |
| GB | 2 322 441 | 8/1998 |

OTHER PUBLICATIONS

English Machine Translation (Abstact, Description, Claims) via EPO website of German Publication EP 0829677 A1.*

* cited by examiner

*Primary Examiner*—Anabel Ton
*Assistant Examiner*—Kevin J. Spinella
(74) *Attorney, Agent, or Firm*—Gudrun E. Huckett

(57) ABSTRACT

A luminaire, in particular a wall or ceiling luminaire protected against sprayed or splashed water, for receiving at least one elongated gas-discharge lamp, having an enclosure able to be assembled into a closed form from a transparent lower part which can be mounted in a fixed position and which holds electrical gear and a transparent upper part, is so designed, with the aim of achieving a form for the upper part and lower part which is economical and meets the demands of the market and in which the two are matched to one another in relation to thermal stresses, that the lower part and the upper part are produced from the same batches of thermoplastic plastics material.

23 Claims, 4 Drawing Sheets

THERMOPLASTIC LIGHT ENCLOSURE HAVING UPPER AND LOWER SEALED PARTS

BACKGROUND OF THE INVENTION

The invention relates to a luminaire, in particular a wall or ceiling luminaire protected against sprayed or splashed water, for receiving at least one elongated gas-discharge lamp, having an enclosure able to be assembled into a closed form from a transparent lower part which can be mounted in a fixed position and which holds electrical gear and a transparent upper part. Luminaires having gas-discharge lamps are generally particularly economical light-sources which can be operated with long lives and with a high light yield in relation to the electrical power which has to be applied. Widespread use is made of such lamps particularly in industrial areas and in domestic side rooms, where certain deficiencies in the spectral distribution of the light and particularly in the length and shape of the lamps impose restrictions in respect of the decorative design of luminaires but are not such an important consideration as in, say, the living area. Luminaires in industrial areas and in basements or garages are also very often subject to requirements for being of a construction which is at least protected against water and are, at the same time, usually highly developed mass-produced products whose price is keenly costed.

Known luminaires of this kind have a lamp enclosure which comprises a highly-transparent upper part and a non-transparent lower part. With a division of this kind, the non-transparent lower part may then be formed by a shell of synthetic resin which absorbs the heat which is given off by the lamps, particularly in the region of the electrodes at the ends, and above all the heat from a ballast (choke) which is arranged inside the lamp, whereas the upper part is produced from a highly transparent thermoplastic plastics material which makes possible the desired division of the radiated light but which has a very much lower resistance to temperature and a very much greater thermal expansion than the thermoset material of the lower part.

The terms "upper part" and "lower part" which are used here and which are commonly employed in German practice do not refer to the respective installed positions, and instead lower part denotes the body of the enclosure, which is to be fastened to a wall or ceiling and which generally also serves as a mounting for the electrical gear, whereas "upper part" denotes a cover which is detachably held by the lower part. It is thus possible, in the case of ceiling mounting say, for the upper part to be at the very bottom.

However, the lower part of non-translucent thermoset material, which is conventionally more resistant to thermal and mechanical stresses, absorbs a considerable proportion of the light which is emitted from the lamp or lamps inside the enclosure. What is more, the distribution of the light is unsatisfactory if large areas of shadow occur on the side on which the lower part is situated. Where mounting is on a wall or ceiling, dark shadowed zones giving an unwanted pattern of illumination then arise, particularly in the areas adjoining the luminaire.

What is more, attempts have already been made to produce trough-like luminaires of this kind which have a transparent lower part made of a material which is the same as or similar to the material of the upper part. However, it has been found that variations in the properties of the material result in mounting and sealing problems which cannot be solved, or at all events not at a cost that meets the demands of the market.

It is therefore an object of the invention to provide a luminaire of the kind considered here which makes possible improved light emission and light distribution without at the same time abandoning the standards of reliability and ruggedness, of easy mounting and handling and in particular of low-cost manufacture to which these lamps have been further developed.

SUMMARY OF THE INVENTION

In accordance with the invention, this object is achieved by a basic luminaire of the aforementioned kind wherein improved light distribution and light emission are to be achieved simply by virtue of the fact that the lower part too is made from a translucent or highly transparent material and the lower part and the upper part are produced from the same batches of thermoplastic plastics material. The distributed light is thus not screened off by the lower part but is also, to a large degree, transmitted. In this way, areas of dark bordering a luminaire of this kind are avoided when mounting is on a wall or ceiling and, at any rate with light walls or ceilings, use can also be made of the light fluxes incident on them which are reflected into the room.

However, the particular sensitivity of the transparent thermoplastic material to heat calls for special precautions to be taken against deformation. Above all, it has to be ensured, without employing designs which, for production reasons, are expensive, complicated and difficult to handle, that the sealing of the enclosure which gives protection against water is not lost as a result of the material heating up and of its expansion which is high due to temperature.

In this regard, it has been found to be effective for the lower part to be produced from thermoplastic plastics material from the same batch as the upper part. However, this requirement cannot then be met simply by virtue of the fact that the material has the same name in both cases. Materials from the same manufacturer which are nominally the same, or even different batches from the same manufacturer, may produce an unsatisfactory match. It may even be useful not simply to rely on the same batch and its homogeneity in the case of the starting material but, in addition, for operation to be such that there is a match in respect of the starting material and the operating conditions. In this way, provision is usefully made for the upper and lower parts to be moulded in a common injecting moulding operation on the same injection moulding machine, or even for a single injection mould to be designed which combines one cavity for the lower part and one cavity for the upper part and which has injection passages which are largely symmetrical or largely of matching lengths.

With material which is the same and finely matched in this way, the changes which result, even with high thermal expansion, are uniform and do not cause any displacement, and stop the upper and lower parts from splaying apart and becoming unsealed as a result.

BRIEF DESCRIPTION OF THE DRAWINGS

Further embodiments of the invention can be seen from the claims. In the following description of an embodiment these, and their advantages, are explained. In the drawings:

DESCRIPTION OF PREFERRED EMBODIMENTS

Figure 1:
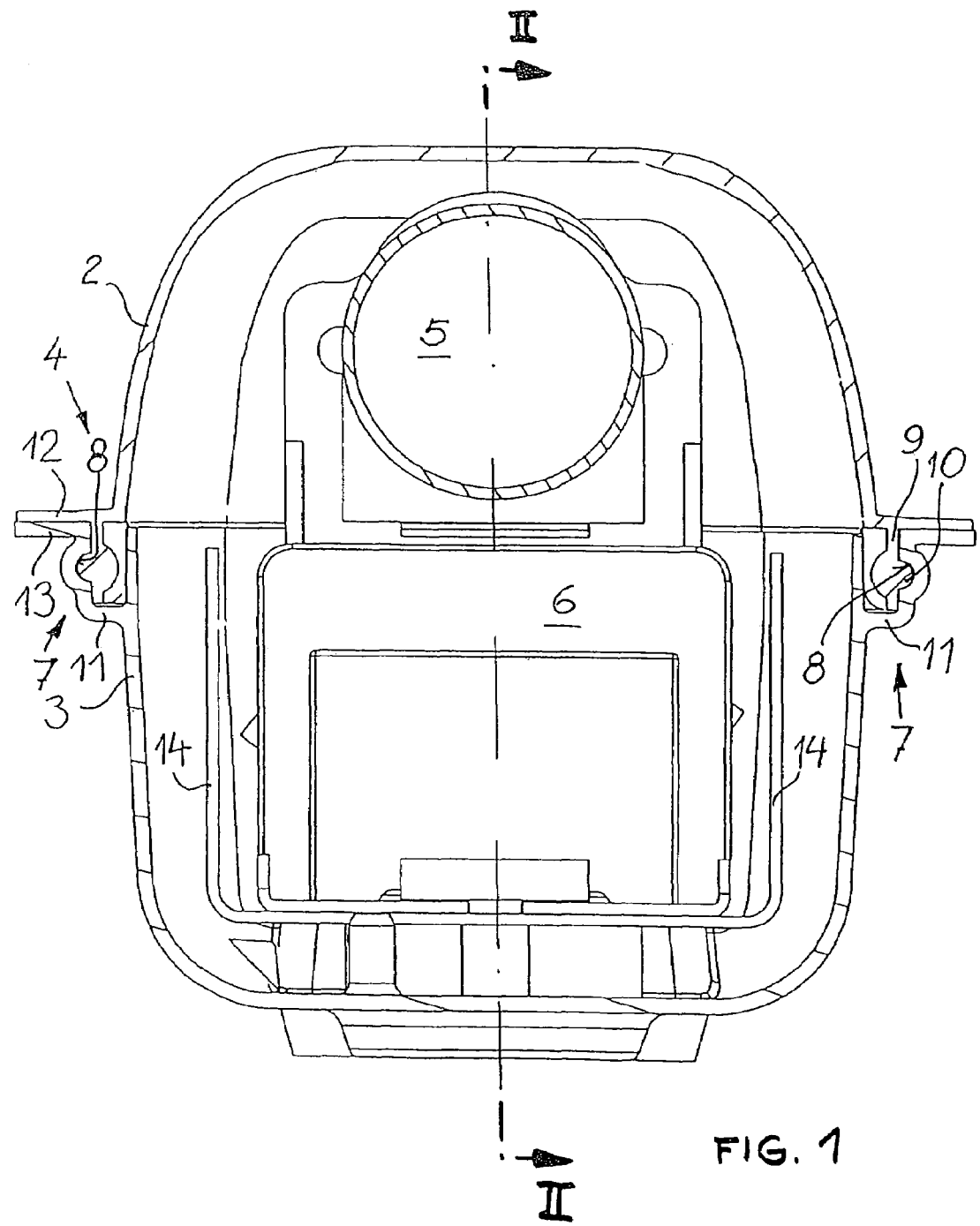
FIG. 1 is a cross-section through a luminaire.

A luminaire which is denoted as a whole by reference numeral 1 has an enclosure which is denoted as a whole by reference numeral 4, which is assembled from a upper part 2 and a lower part 3, which extends, in the direction of viewing of FIG. 1, in an approximately prismatic elongated shape adapted to a gas-discharge lamp 5 of elongated tubular shape situated inside it, and which terminates at the ends in the form of caps. The upper part 2 is composed in a known manner of a transparent thermoplastic plastics material such as, say, an acrylic "glass" (PMMA) or a transparent polycarbonate. The lower part is composed in a novel manner of the same material, with the match being obtained not only in respect of the basic material and its additives and, if required, the source of supply, but also in respect of the batch from which supply takes place, the state of storage and of temperature and the processing operation, and in particular the extrusion operation.

This match is usefully achieved by having the thermoplastic material injected, in a common injection operation, into one injection mould or cavity for the upper part 2 and one injection mould or cavity for the lower part 3. The matching is assisted to a further degree by having a single injection mould contain both a cavity for an upper part 2 and a cavity for a lower part 3, in which case the distances of injection and the injection passages are also matched to one another. The basic concept of almost twinned injection moulding of this kind of complementary parts of the enclosing shell is of course also open to multiplication, where a plurality of upper and lower parts are injection moulded simultaneously in one mould, though there are practical limits which militate against such multiplication in the form of the size of the injection moulds and the clamping forces which then have to be applied. With current technology, the enclosure parts, which are elongated and are thus rather large simply for this reason, will not go beyond a single pair of upper and lower parts.

This at any rate gives an injection moulding operation in which the injection moulding machine, via its injection gate, introduces a unitary injectable material into a mould, in which mould the material distributes itself, within the mould, to the cavities, which are situated next to one another, in a way which is very largely symmetrical and at a balanced temperature.

The particular purpose of this way of arranging the mould and the process is to achieve, for the behaviour of the enclosure with temperature, and in particular for its expansion with temperature, the best possible match between the upper and lower parts. The enclosure 4 is subject to thermal stresses from the exterior caused by varying temperatures of the ambient air, and possibly also by incident solar radiation or by precipitation, but above all it undergoes thermal stresses which are caused by the heat generated by the gas-discharge lamp 5, predominantly in the region of the electrodes at the ends, and also by a ballast 6, which is likewise intended to be covered and protected by the enclosure 4 and whose effect would only be that of a loss-free choke (induction coil) in the ideal case and which instead, for reasons of size and cost of manufacture, does cause electrical losses, which may result in a temperature of up to more than 200 C.

Whereas conventional enclosures for gas-discharge lamps have been fitted with a lower part made of a thermally rugged thermoset plastics material which absorbs the thermal stresses with a high temperature resistance and low thermal expansion, the transparent thermoplastic material which is used in accordance with the invention is very much more prone to such stresses. Thus, in the present case the solution to the problem lies not in a more rugged lower part but in matching the upper and lower parts so that, when thermal expansions cannot be kept low due to the material, the thermal expansions can be matched to one another and in this way the possibility of stressing and distortion of the enclosure can be ruled out.

The enclosure is thus made transparent in the lower part 3 too, which means that light which is emitted by the gas-discharge lamp 5 in the region of the said lower part 3 emerges, the casting of shadows is avoided around the lower part 3 and, where mounting is on a wall or ceiling, it brings additional light into the room by reflection, with the enclosure as a whole also acquiring an advantageously bright appearance.

It will be appreciated that in place of the individual gas-discharge lamp 5, two or more gas-discharge lamps would equally well be arranged in an enclosure in a perfectly normal way without this resulting in anything different happening.

With regard to the stresses, and in particular the thermal stresses, on the enclosure which were considered above, a key role is played by the region of the connection between the upper part 2 and the lower part 3, in which case provision has to be made both for the inexpensive and uncomplicated manufacture which is a prerequisite for mass-produced products of this kind where the competitive pricing is keen, and for uncomplicated handling by the installing engineer or purchaser. Accordingly, there is provided for the purpose of connecting the upper and lower parts a latching arrangement 7 in which a sealing groove 8 is moulded-in on one side, namely in the present case on the side on which the lower part 3 is situated. The sealing groove is open in a direction transverse to a closing movement of the upper part 2 towards the lower part 3 and is overlapped by an insertable rim 9 on the upper part, which rim 9 has, in turn, an outwardly projecting annular bead 10 which fits into the annular groove. This latching arrangement, which is in itself typical, is supplemented, for the purposes of improved protection against water, by having the insertable rim 9 (on the upper part 2) engage in a receptacle 11 for the insertable rim 9, which receptacle 11 is U-shaped in cross-section, extends round in a loop at the edge, and fits round and covers the insertable rim 9. Mechanical stresses on the enclosure 4, in a water test say, and particularly when occurring in conjunction with thermal stresses on the enclosure, thus do not result in the upper part 2 and lower part 3 splaying apart, which would be a risk as far as protection against splashed or sprayed water was concerned.

Figure 1A:
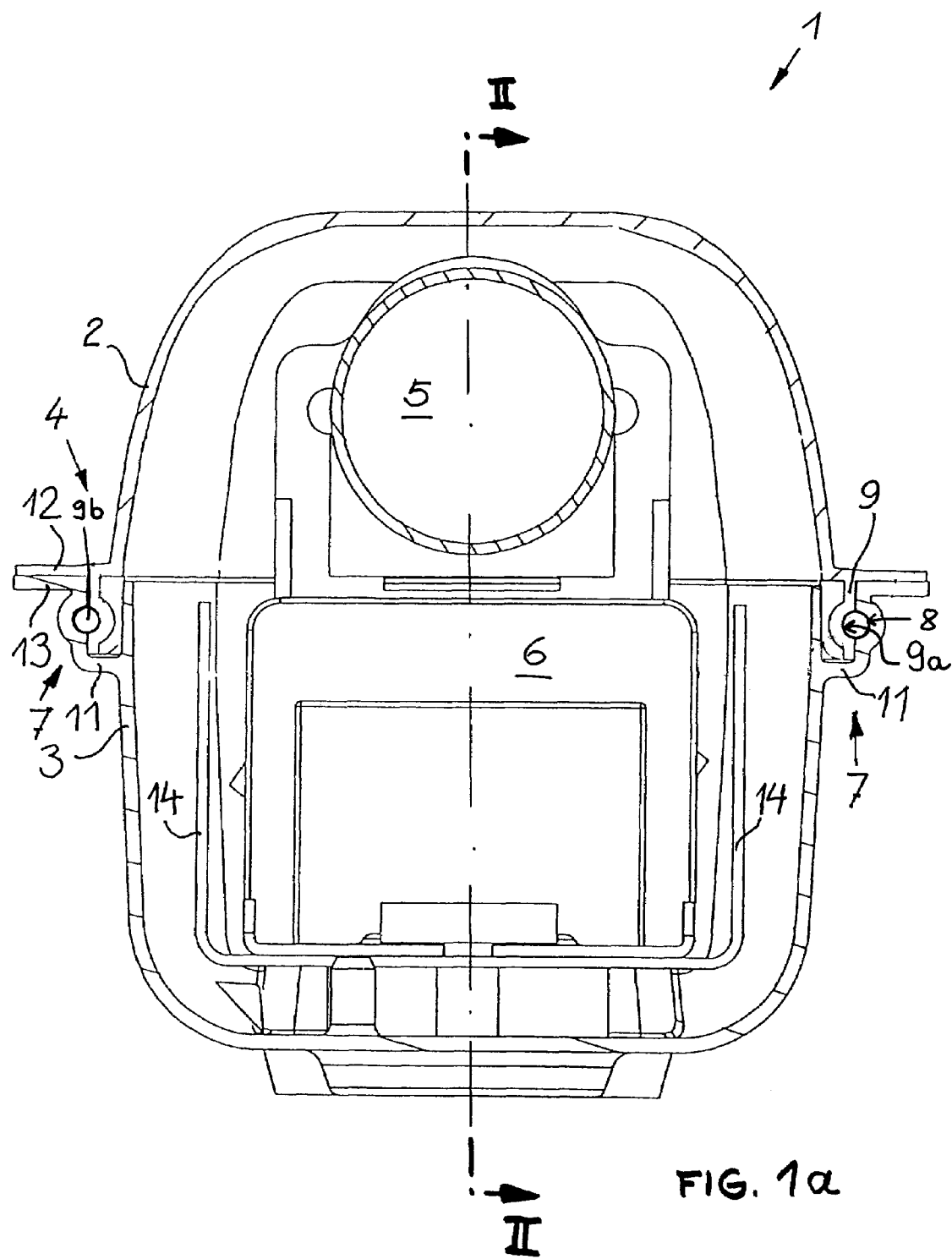
FIG. 1a is a cross-section of a variant of the luminaire of FIG. 1.

The annular bead 10, which is formed simply by the injection moulding of the upper part 2, provides the simplest and cheapest form of latching engagement. It will however be appreciated that the insertable rim 9 may likewise be provided, in cross-section, with a sealing groove 9*a* which corresponds to and is situated opposite the sealing groove 8, thus leaving an intervening space of circular cross-section into which an elastic ring-seal 9*b* extending round in a loop has to be inserted (see FIG. 1*a*). This is what will need to be provided particularly in the case of materials which prove to be too solid or too rigid for a latching connection.

In FIG. 1, there can be seen on both sides in the region of the connection between the upper part 2 and lower part 3, gripping lugs 12, 13 which are integrally moulded on the upper part 2 and lower part 3 respectively. Looking in the direction of viewing, and hence in the longitudinal direction of the enclosure 4, these are offset from one another just sufficiently far for them not to overlap one another. They make it possible for the parts of the enclosure to be released from the latched position with the fingers (i.e. without tools).

As can also be seen in FIG. 1, the ballast 6 is screened off from the lower part 3 by a screening member 14. This a metal plate bent into a U which is fixed at the bottom between the ballast 6 and pedestal extensions which are formed on the bottom region of the lower part 3 but which extends up at the sides, at a distance from the ballast 6, approximately to the same height as the latter, to enable radiant heat and also convection in the direction of the lower part 3 to be intercepted as satisfactorily as possible.

Figure 2:
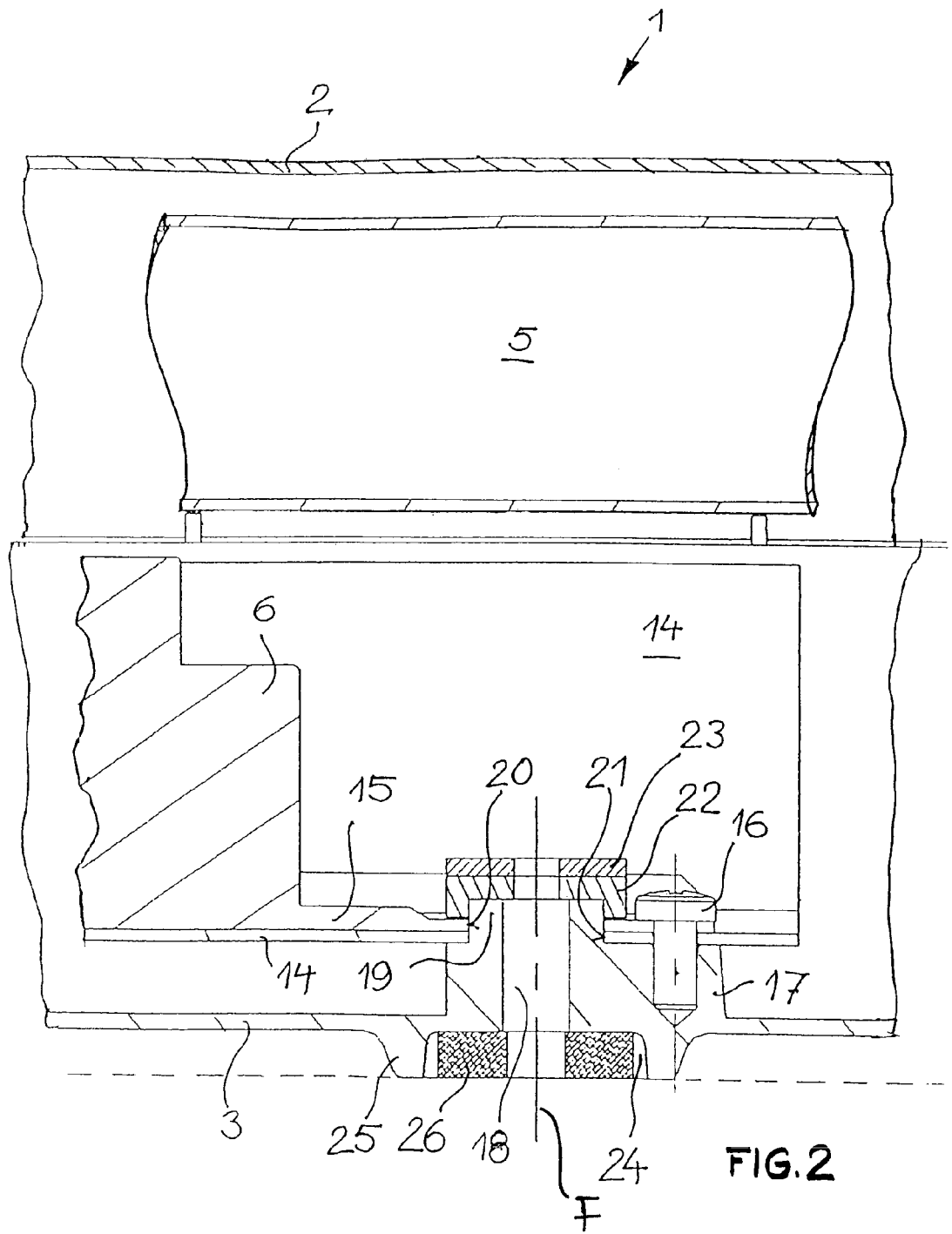
FIG. 2 is a partial longitudinal section on line II-II in FIG. 1.

Shown in the longitudinal section in FIG. 2, as a detail, is only a small part of the overall length of the luminaire, what can be seen in particular being the ballast 6, which has a bottom portion 15 which projects particularly for mounting purposes, and the screening member 14, which likewise projects beyond the ballast 6 in the longitudinal direction. As prefitted for transport, by a screw 16, say, both of these items are fastened to a pedestal region 17 of the lower part 3.

This pedestal region 17 has a vertical through-opening 18 which opens in the upward direction from an extension 19 which, with insulation, fits through a mounting hole 20 in the ballast 6, or rather in the bottom portion 15, and a mounting hole 21 in the screening member 14. An insulating washer 22 and a preferably metallic washer 23 are provided to allow the luminaire 1, when it is mounted on a wall or ceiling, to be screwed firmly to a support by a screw or a comparable fixing means F (schematically indicated in FIG. 2 by a center axis through the bore 18) which passes through them in the outward direction. In this way the ballast, being a critical component in view of its particular weight and the heat it generates, is fixed in place relative to a structural support in an expeditious manner. The insulating washer 22, which is of a cup-like form, enables the fixing means F to be pressed against the bottom portion 15 of the ballast regardless of an amount by which the extension 19 may project.

Basically, a seal which generally has to be provided for the mounting opening can be made internally in the region of the through-opening 18 or the insulating washer 22. In the present case a receptacle 24, in which a sealing washer 26 has to be inserted, is provided at the bottom side, and thus on the outside, in the region of a foot 25 on the lower part 3.

Figure 3:
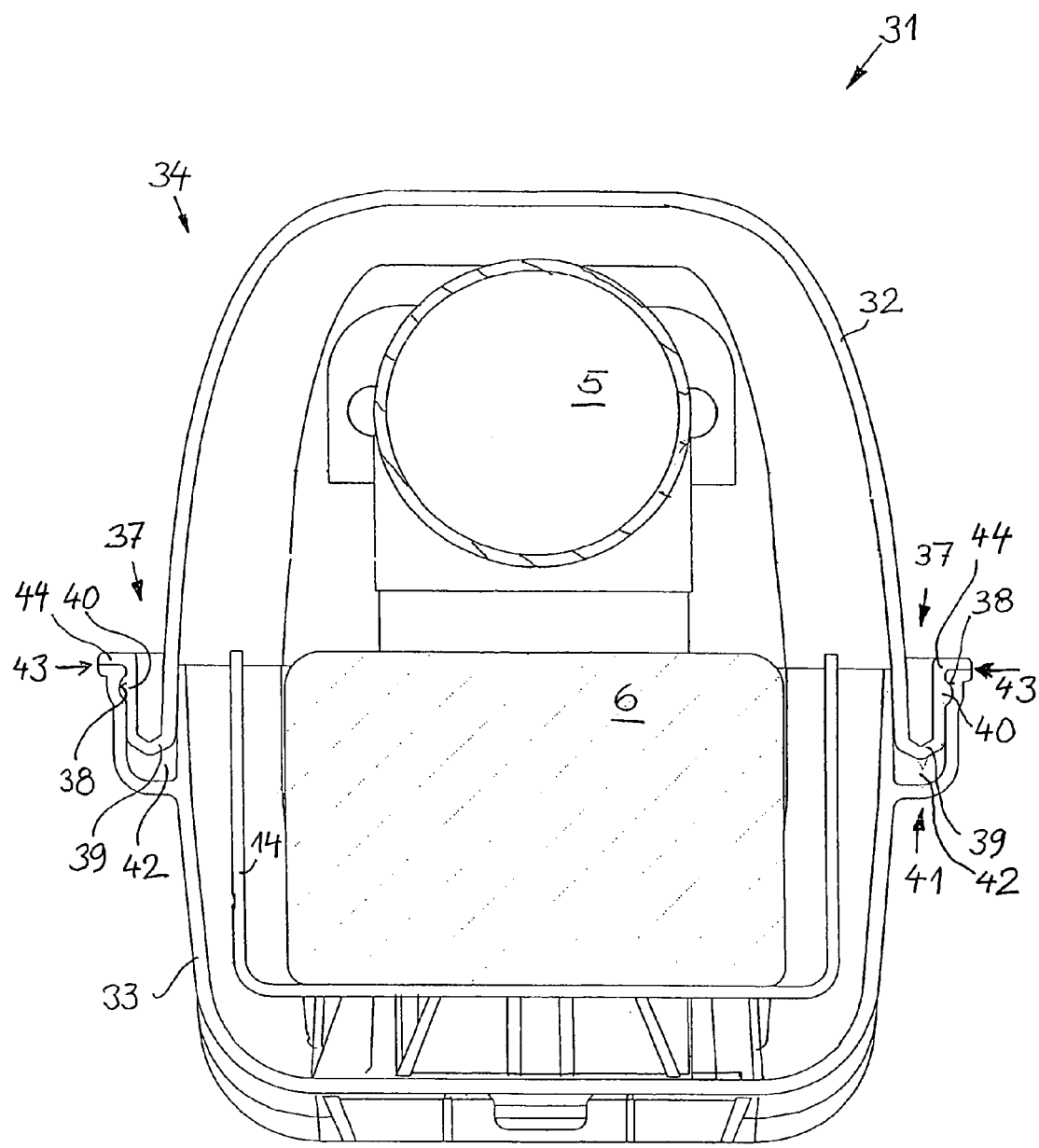
FIG. 3 is a cross-section through a modified form of luminaire.

A modified embodiment of the luminaire, which is shown in FIG. 3, is denoted as a whole by reference numeral 31 and once again has an enclosure 34 comprising an upper part 32 and a lower part 33, a marked difference from the luminaire 1 considered above being the fact that what is provided for a latching arrangement 37 is an insertable rim 39 which is in the form of a U-profile in cross-section. Like the insertable rim 9 in the case of the luminaire 1, this insertable rim 39 is intended, when there is a closing movement between the upper part 32 and the lower part 33, to penetrate into a U-shaped receptacle 41 in that edge of the lower part 33 which faces towards the upper part 32, and to latch there in a lateral sealing groove 38 by an annular bead 40 which fits the latter. The forming of the insertable rim 39 as an open hollow profile gives some elasticity in the transverse direction and hence a springiness which presses the annular bead 40 into the annular groove 38 without the pressing forces involved preventing the upper part 32 and lower part 33 from being inserted in one another or separated from one another. To obtain preset pressing forces, a pre-loading may be provided by design by making the insertable rim 39 wider in the region of the annular bead 40 than the receptacle is in the region of the sealing groove 38. When the upper part 32 and lower part 33 are plugged together, the insertable rim 39 is thus compressed elastically by a preset amount and/or the receptacle 41 is spread open elastically in cross-section. This improves the sealing seating in the latching region.

What is also of benefit however is a channel-like free intervening space 42 between the insertable rim 39 and the receptacle 41. The receptacle 41 is thus not so configured in cross-section that it fits tightly around the insertable rim 39 but that it leaves a free space. This intervening space (42) has proved satisfactory in sprayed water tests as an enclosed space for keeping out of the interior of the enclosure small amounts of water which, possibly while the pressure of the water jet from outside is high, manage to pass through the seal between the annular bead 40 and the sealing groove 38. In this case, sufficiently well sealed planar contact between the overlapping continuations of the upper part 32 of the enclosure and the lower part 33 of the enclosure stops water from running into the interior of the lamp enclosure 34 from the intervening space 42. On the other hand, the insertable connection between the upper part 32 and lower part 33 cannot be considered hermetically sealed, which means that moisture which might have a minor effect can make its way into the open air as a result of diffusion movements and compensating movements at the time of variations in heat and pressure.

For the stiffness and also for the sealing of the latching engagement 37, it is advantageous for there to be dose contact between the insertable rim 39 and the receptacle 41 created by a configuration of curved cross-section for an outer intervening gap 43. This gap prevents sprayed water, even in a tight jet, from penetrating through to the region of the seal between the sealing groove 38 and the annular bead 40 and it masks off this region with an end-flange 44 which at the same time makes a contribution to the shape-induced stiffness, in the longitudinal direction, of the profile forming the insertable rim.

What is claimed is:

1. A luminaire for at least one elongated gas-discharge lamp, the luminaire comprising:
   an enclosure comprised of a transparent lower part and a transparent upper part, wherein the lower part is adapted to be mounted in a fixed position;
   electrical gear arranged in the lower part;
   wherein the lower part and the upper part are assembled to a closed form thus providing a protection against sprayed or splashed water;
   wherein the lower part and the upper part consist of thermoplastic material and are made from same batches of the thermoplastic material;
   wherein the upper part and the lower part each have a circumferentially extending rim extending about an entire circumference of the upper and lower parts, respectively, wherein the rims overlap one another and a first one of the rims has a first sealing groove and a second one of the rims has a second sealing groove, wherein the first and second sealing grooves each extend about the entire circumference of the upper and lower parts, respectively, and together delimit an intervening space extending about the entire circumference of the upper and lower parts, respectively, and having a circular cross-section and wherein the enclosure further comprises a ring seal that is arranged in the intervening space of the first and second sealing grooves.

2. The luminaire according to claim 1, wherein the upper part and the lower part are injection-molded parts produced in a single injection molding operation.

3. The luminaire according to claim 2, wherein the upper part and the lower part are injection-molded in a common mold of substantially symmetrical design with respect to the injection molding operation.

4. The luminaire according to claim 1, further comprising a ballast and a screening member inside the enclosure, wherein the screening member is arranged such that the ballast is screened relative to the enclosure.

5. The luminaire according to claim 4, wherein the screening member comprises a sheet-metal component.

6. The luminaire according to claim 4, wherein the ballast is fastened to the lower part, wherein the ballast has a mounting hole allowing a fixing member to pass from an interior of the lower part to the exterior of the lower part for fastening the lower part to a wall or a ceiling.

7. The luminaire according to claim 6, wherein the screening member has a mounting hole aligned with the mounting hole of the ballast.

8. The luminaire according to claim 6, wherein the lower part has a through-opening and a receptacle for a sealing element, wherein the through-opening and the receptacle for the sealing element are aligned with the mounting hole of the ballast.

9. The luminaire according to claim 1, wherein the enclosure is comprised of acrylic glass or a polycarbonate.

10. A method of producing an enclosure for a luminaire according to claim 1, the method comprising the step of:
simultaneously molding an upper part and a lower part from a common source of thermoplastic material in adjacent cavities of an injection mold.

11. The luminaire according to claim 1, wherein the first rim is provided with at least one gripping lug and wherein the second rim is provided with at least one gripping lug, wherein the at least one gripping lug of the first rim and the at least one gripping lug of the second rim are arranged adjacent and offset to one another without overlap in a circumferential direction of the first and second rims.

12. A luminaire for at least one elongated gas-discharge lamp, the luminaire comprising:
an enclosure comprised of a transparent lower part and a transparent upper part, wherein the lower part is adapted to be mounted in a fixed position;
electrical gear arranged in the lower part;
wherein the lower part and the upper part are assembled to a closed form thus providing a protection against sprayed or splashed water;
wherein the lower part and the upper part consist of thermoplastic material and are made from same batches of the thermoplastic material;
wherein the upper part and the lower part each have a circumferentially extending rim extending about an entire circumference of the upper and lower parts, respectively, wherein the rims overlap one another and wherein a first one of the rims is a receptacle and a second one of the rims is an insertable rim that is received in the receptacle;
wherein the receptacle is U-shaped in cross-section and has an outwardly positioned side relative to an interior of the enclosure, wherein the outwardly positioned side has a receiving groove;
wherein the insertable rim has a U-shape in cross-section, wherein the U-shape has two legs with first and second ends, respectively, wherein the first ends of the two legs are connected to one another to form a closed bottom end of the U-shape and wherein the insertable rim is inserted in an insertion direction into the receptacle with the closed bottom end leading in the insertion direction such that an open end of the U-shape of the receptacle and an open end of the U-shape of the insertable rim face in the same direction.

13. The luminaire according to claim 12, wherein the upper part and the lower part are injection-molded parts produced in a single injection molding operation.

14. The luminaire according to claim 13, wherein the upper part and the lower part are injection-molded in a common mold of substantially symmetrical design with respect to the injection molding operation.

15. The luminaire according to claim 12, further comprising a ballast and a screening member inside the enclosure, wherein the screening member is arranged such that the ballast is screened relative to the enclosure.

16. The luminaire according to claim 15, wherein the screening member comprises a sheet-metal component.

17. The luminaire according to claim 15, wherein the ballast is fastened to the lower part, wherein the ballast has a mounting hole allowing a fixing member to pass from an interior of the lower part to the exterior of the lower part for fastening the lower part to a wall or a ceiling.

18. The luminaire according to claim 17, wherein the screening member has a mounting hole aligned with the mounting hole of the ballast.

19. The luminaire according to claim 17, wherein the lower part has a through-opening and a receptacle for a sealing element, wherein the through-opening and the receptacle for the sealing element are aligned with the mounting hole of the ballast.

20. The luminaire according to claim 12, wherein the enclosure is comprised of acrylic glass or a polycarbonate.

21. A method of producing an enclosure for a luminaire according to claim 12, the method comprising the step of:
simultaneously molding an upper part and a lower part from a common source of thermoplastic material in adjacent cavities of an injection mold.

22. The luminaire according to claim 12, wherein the insertable rim and the receptacle engage one another under elastic loading.

23. The luminaire according to claim 12, wherein the receptacle has an intervening space that is closed off by the insertable rim toward an interior of the enclosure and toward an exterior of the luminaire.

* * * * *